United States Patent
Tang et al.

(10) Patent No.: US 11,218,939 B2
(45) Date of Patent: Jan. 4, 2022

(54) METHODS RELATING TO NETWORK SLICE SELECTION REQUESTS

(71) Applicant: Nokia Solutions and Networks Oy, Espoo (FI)

(72) Inventors: Haitao Tang, Espoo (FI); Kaj Peter Stenberg, Sundsberg (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 154 days.

(21) Appl. No.: 16/611,756

(22) PCT Filed: May 10, 2017

(86) PCT No.: PCT/FI2017/050362
§ 371 (c)(1),
(2) Date: Nov. 7, 2019

(87) PCT Pub. No.: WO2018/206839
PCT Pub. Date: Nov. 15, 2018

(65) Prior Publication Data
US 2020/0068473 A1 Feb. 27, 2020

(51) Int. Cl.
*H04W 36/32* (2009.01)
*H04W 36/00* (2009.01)
(Continued)

(52) U.S. Cl.
CPC ..... *H04W 36/32* (2013.01); *H04W 36/00837* (2018.08); *H04W 48/04* (2013.01); *H04W 48/18* (2013.01)

(58) Field of Classification Search
CPC ........... H04W 36/32; H04W 36/00837; H04W 48/04; H04W 48/18
See application file for complete search history.

(56) References Cited

U.S. PATENT DOCUMENTS

| | | |
|---|---|---|
| 2013/0303114 A1 | 11/2013 | Ahmad et al. |
| 2016/0345222 A1 | 11/2016 | Axmon et al. |

(Continued)

FOREIGN PATENT DOCUMENTS

| | | |
|---|---|---|
| WO | 2016/150468 A1 | 9/2016 |
| WO | 2016/162480 A1 | 10/2016 |

OTHER PUBLICATIONS

"3rd Generation Partnership Project; Technical Specification Group Services and System Aspects; Study on Architecture for Next Generation System (Release 14)", 3GPP TR 23.799, V14.0.0, Dec. 2016, pp. 1-522.

(Continued)

*Primary Examiner* — Joshua L Schwartz
(74) *Attorney, Agent, or Firm* — Squire Patton Boggs (US) LLP

(57) ABSTRACT

In a first aspect, this specification describes a method which comprises including, in a network slice selection request, information indicative of a reason for making the network slice selection request. The method of the first aspect may, for instance, be performed by a user equipment (UE). In a second aspect, this specification describes a method which comprises determining a response to a network slice selection request from a UE based on information included in the network slice selection request that is indicative of a reason for making the network slice selection request. The method of the second aspect may, for instance, be performed by a network control function (e.g. a CCNF).

17 Claims, 7 Drawing Sheets

(51) Int. Cl.
*H04W 48/04* (2009.01)
*H04W 48/18* (2009.01)

(56) References Cited

U.S. PATENT DOCUMENTS

| | | | |
|---|---|---|---|
| 2017/0079059 A1 | 3/2017 | Li et al. | |
| 2017/0086118 A1 | 3/2017 | Vrzic | |
| 2017/0357528 A1* | 12/2017 | Puranik | H04L 67/10 |
| 2020/0351756 A1* | 11/2020 | Jager | H04L 47/127 |
| 2021/0153077 A1* | 5/2021 | Samdanis | H04W 24/02 |

OTHER PUBLICATIONS

"3rd Generation Partnership Project; Technical Specification Group Services and System Aspects; System Architecture for the 5G System; Stage 2 (Release 15)", 3GPP TS 23.501, V0.3.1, Mar. 2017, pp. 1-97.

"3rd Generation Partnership Project; Technical Specification Group Services and System Aspects; Procedures for the 5G System; Stage 2 (Release 15)", 3GPP TS 23.502, V0.2.0, Feb. 2017, pp. 1-71.

"The 5G Infrastructure Public Private Partnership", 5G-PPP, Retrieved on Nov. 1, 2019, Webpage available at : https://5g-ppp.eu/.

International Search Report and Written Opinion received for corresponding Patent Cooperation Treaty Application No. PCT/FI2017/050362, dated Sep. 8, 2017, 17 pages.

"3rd Generation Partnership Project; Technical Specification Group Services and System Aspects; System Architecture for the 5G System; Stage 2 (Release 15)", 3GPP TS 23.501, V0.4.0, Apr. 2017, pp. 1-124.

"3rd Generation Partnership Project; Technical Specification Group Services and System Aspects; Telecommunication management; Study on management and orchestration of network slicing for next generation network (Release 14)", 3GPP TR 28.801, V1.1.0, Mar. 2017, pp. 1-60.

"3rd Generation Partnership Project; Technical Specification Group Services and System Aspects; Feasibility Study on New Services and Markets Technology Enablers; Stage 1 (Release 14)", 3GPP TR 22.891, V14.2.0, Sep. 2016, pp. 1-95.

Zhou et al., "Network Slicing as a Service: Enabling Enterprises own Software-Defined Cellular Networks", IEEE Communications Magazine, vol. 54, No. 7, Jul. 2016, pp. 146-153.

Extended European Search Report received for corresponding European Patent Application No. 17908963.6, dated Nov. 16, 2020, 13 pages.

"Network Slice Selection Assistance Information over RRC", 3GPP TSG-RAN WG2 Meeting #98, R2-1705008, Agenda : 10.2.11, Huawei, May 15-19, 2017, 4 pages.

"A Solution of Network Slice Instance Selection and Association", SA WG2 Meeting #S2-116BIS, S2-165127, Agenda : 6.10.1, Apple, Aug. 29-Sep. 2, 2016, pp. 1-6.

"Remaining Issues for Idle Mode Cell Selection and Reselection", 3GPP TSG-RAN WG2 #97, R2-1700999, Agenda : 10.3.1.2, Xiaomi, Feb. 13-17, 2017, pp. 1-5.

* cited by examiner

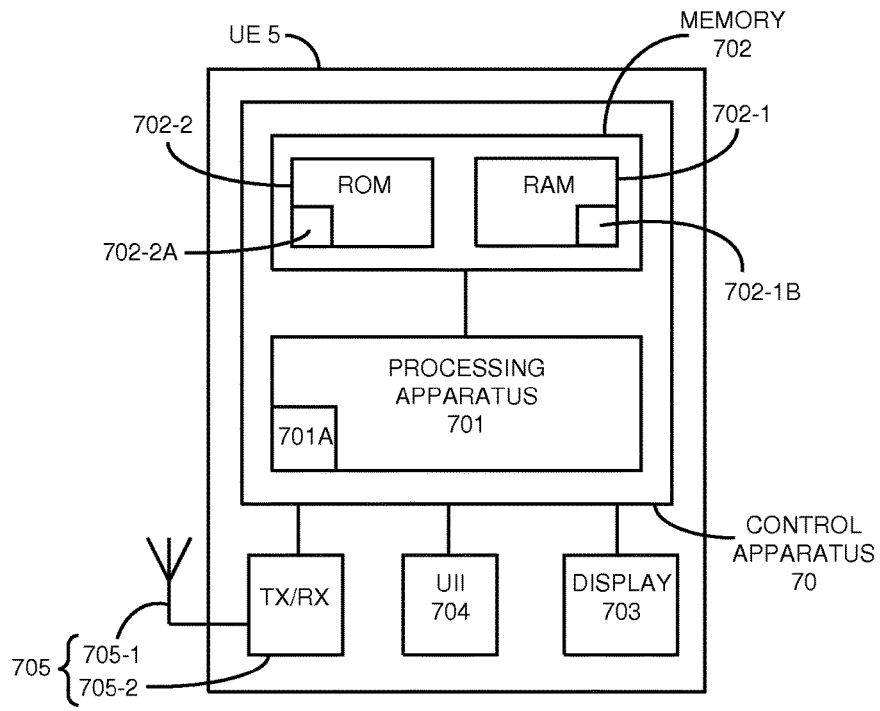
FIG. 7
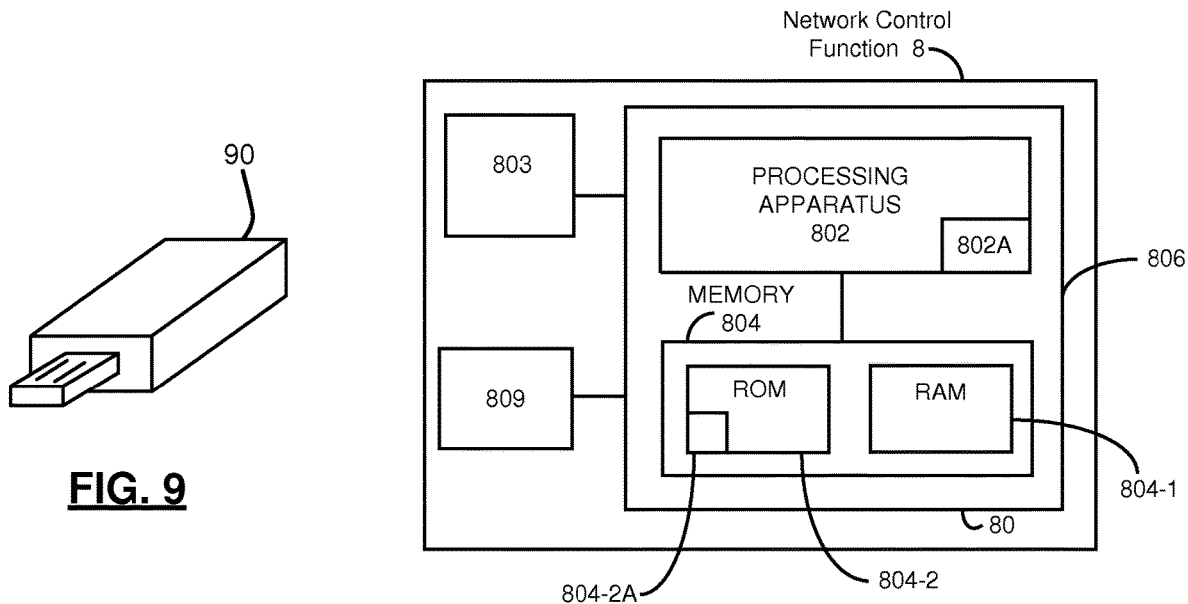
FIG. 9
FIG. 8

METHODS RELATING TO NETWORK SLICE SELECTION REQUESTS

RELATED APPLICATION

This application was originally filed as PCT Application No. PCT/FI2017/050362 filed May 10, 2017.

FIELD

This specification relates to network slice selection requests, particularly the generation of, and responses to, such requests.

BACKGROUND

Current 5G architecture designs include the ability to partition a single physical network into multiple virtual networks or, put another way, into multiple logical network slices. This partitioning of physical networks is known as "network slicing" and may allow network operators to provide networks on an "as-a-service" basis in order to satisfy the varying requirements of the wide range of different applications, which are expected to make use of 5G networks.

For instance, in a single 5G network, network slicing technology can provide, for a first application (e.g. smart meters), a network slice that provides a high availability and high reliability service, with a given latency, data rate and security level, while also providing another network slice with very high throughput, high data speeds and low latency for another application. Since the slices of the network are isolated from each other in the control and user planes, the user experience of the network slice will be the same as if it was a physically separate network.

A network-side function, for instance a Common Control Network Function (CCNF), may inform user equipments (UEs) as to the tenants (that is third parties who manage one or more network slices) and slices/services that are available for the UEs to access. This may be performed using a Network Slice Selection Assistance Information (NSSAI)-based solution (see, for instance, Sec. 6.1.5 of 3GPP TR23.799, v14) or its equivalent MultiDimensional Descriptor (MDD)-based solution (Sec. 6.1.2 of 3GPP TR23.799, v14). The UE can thus indicate to the network (e.g., the CCNF) its preferred tenant and network slice/service from those available.

In this way, it may be possible to associate particular UE application type with its corresponding network service type. For example, a medical application type may be associated with a suitable service type, such as Critical Communications (CriC) service type. The medical application of the UE can then access the corresponding slice for the CriC service that is provided by a tenant. The UE may also be able to reselect another slice/service for the given application when the UE determines that it needs to do so and the network allows it.

SUMMARY

In a first aspect, this specification describes a method which comprises including, in a network slice selection request, information indicative of a reason for making the network slice selection request. The method may for instance be performed by a user equipment (UE).

The network slice selection request may be a network slice reselection request and the method may further comprise including, in the network slice reselection request, information indicative of an attribute for which a predetermined requirement is not satisfied by a current network slice. The method may further comprise including, in the network slice reselection request, information indicative of a measure of the attribute for which the predetermined requirement is not satisfied by the current network slice. Alternatively or additionally, the method may further comprise including, in the network slice reselection request, information indicative of the predetermined requirement that is not satisfied by the current network slice.

The method may comprise receiving a response to the network slice selection request, the response including an indication as to whether the network slice selection request has been granted or denied wherein, when the response includes an indication that the network slice selection request has been denied, the response further includes information indicative of a reason for denial of the network slice selection request. The method may further comprise using the information indicative of the reason for denial of the network slice selection request to determine whether to send another network slice reselection request.

In a second aspect, this specification describes a method which comprises determining a response to a network slice selection request from a user equipment based on information included in the network slice selection request that is indicative of a reason for making the network slice selection request. The method may, for instance, be performed by a network control function (e.g. a CCNF).

The determined response may include granting access to a network slice to the user equipment or denying the network slice selection request. The method may further comprise providing a network slice selection request response which includes an indication as to whether the network slice selection request has been granted or denied wherein, when the network slice selection request response includes an indication that the network slice selection request has been denied, the network slice selection request response includes information indicative of a reason for denying the network slice selection request.

The method may comprise creating a data entry corresponding to the received network slice selection request and determining a response to another network slice selection request from a user equipment (which may be the user equipment from which the first request was received or a different user equipment) based at least in part on the created data entry. In an event that the network slice selection request to which the data entry relates was granted, the method may comprise determining whether the network slice selection has been successful, and including in the data entry an indication as to whether the network slice selection has been successful or unsuccessful.

Determining whether the network slice selection has been successful may comprise, starting a timer following granting access to the network slice and either, in response to a determination that the timer has expired without a network slice reselection request having been received, determining that that network slice selection has been successful, or, in response to receiving a network slice reselection request prior to expiry of the timer, determining that the network slice selection has been unsuccessful. The duration of the timer may be determined based on a geo-location and or a geo-speed of the user equipment from which the network slice selection request was received.

The method may further comprise, in response to receiving the other network slice selection request, determining whether the network slice selection request to the which the created data entry relates is sufficiently similar to the other network slice selection request; and in response to a positive determination, determining the response to the further network slice selection request based at least in part on the created data entry. Determining the similarity between the further network slice selection request and the network slice selection request to which the created data entry relates may be based on one or more of: information describing the network slices requested in the requests, information describing the network slices being accessed by the respective user equipment when the requests were sent, and information describing one or more cells being accessed by the respective user equipment when the requests were sent.

The method may comprise determining the response to the other network slice selection request based at least in part on the indication in the created data entry as to whether the network slice selection to which the data entry relates was successful.

The method may comprise, in response to receiving the other network slice selection request, identifying plural data entries each relating to a respective previous network slice selection request that is sufficiently similar to the further network slice selection request, based on the identified data entries, determining one or more success rates based on the indications in the data entries as to whether the network slice selection to which the data entry relates was successful, comparing the one or more success rates to respective thresholds, and if the one or more success rates are above the respective thresholds, granting the further network slice selection request by granting access to a network slice to the user equipment that sent the other network slice selection request. The method may comprise identifying the plural data entries each relating to a respective previous network slice selection request that sufficiently is similar to the other network slice selection request, determining the one or more success rates based on the identified entries, only if the number of the identified plural data entries exceeds a threshold, and if the number of the identified plural data entries does not exceed a threshold, determining whether to grant or deny the further network slice selection request without considering the identified data entries.

The method may comprise determining the response to the other network slice selection request based at least in part on a determination as to whether a reason for making the further network slice selection request is bounded by the reason for which the network slice selection request to which the created data entry relates was made.

In a third aspect, this specification describes apparatus configured to cause performance of any method described with reference to the first aspect. The apparatus may comprise at least one processor and at least one memory including computer program code which, when executed by the at least one processor, causes the apparatus to perform any method described with reference to the first aspect. The apparatus of the third aspect may be, or may be a component of, a user equipment (UE).

In a fourth aspect, this specification describes apparatus configured to cause performance of any method described with reference to the second aspect. The apparatus may comprise at least one processor and at least one memory including computer program code which, when executed by the at least one processor, causes the apparatus to perform any method described with reference to the second aspect. The apparatus of the fourth aspect may be, or may be a component of, a network control function (e.g. a CCNF).

In a fifth aspect, this specification describes computer-readable/code instructions, which may be stored on one or more computer-readable medium and which, when executed by computing apparatus/at least one processor, cause the computing apparatus/at least one processor to perform any method described with reference to the first aspect.

In a sixth aspect, this specification describes computer-readable/code instructions, which may be stored on one or more computer-readable medium and which, when executed by computing apparatus/at least one processor, cause the computing apparatus/at least one processor to perform any method described with reference to the second aspect.

In a seventh aspect, this specification describes apparatus comprising means for including, in a network slice selection request, information indicative of a reason for making the network slice selection request. The apparatus of the seventh aspect may further include means for performing any of the operations described with reference to the method of the first aspect.

In an eighth aspect, this specification describes apparatus comprising means for determining a response to a network slice selection request from a user equipment based on information included in the network slice selection request that is indicative of a reason for making the network slice selection request. The apparatus of the eighth aspect may further include means for performing any of the operations described with reference to the method of the second aspect.

BRIEF DESCRIPTION OF THE FIGURES

For better understanding of the present application, reference will now be made by way of example to the accompanying figures in which:

FIG. 7 is a schematic example of a configuration of a UE which may perform various operations as described with reference to FIGS. 1, 2 and 6;

FIG. 8 is a schematic example of a configuration of a network control function which may perform various operations as described with reference to FIGS. 1, 3, 4, 5 and 6; and FIG. 9 is an example of a storage device on which computer-readable instructions for causing performance of any of the operations described with reference to FIGS. 1 to 8 may be stored.

DETAILED DESCRIPTION

Figure 1:
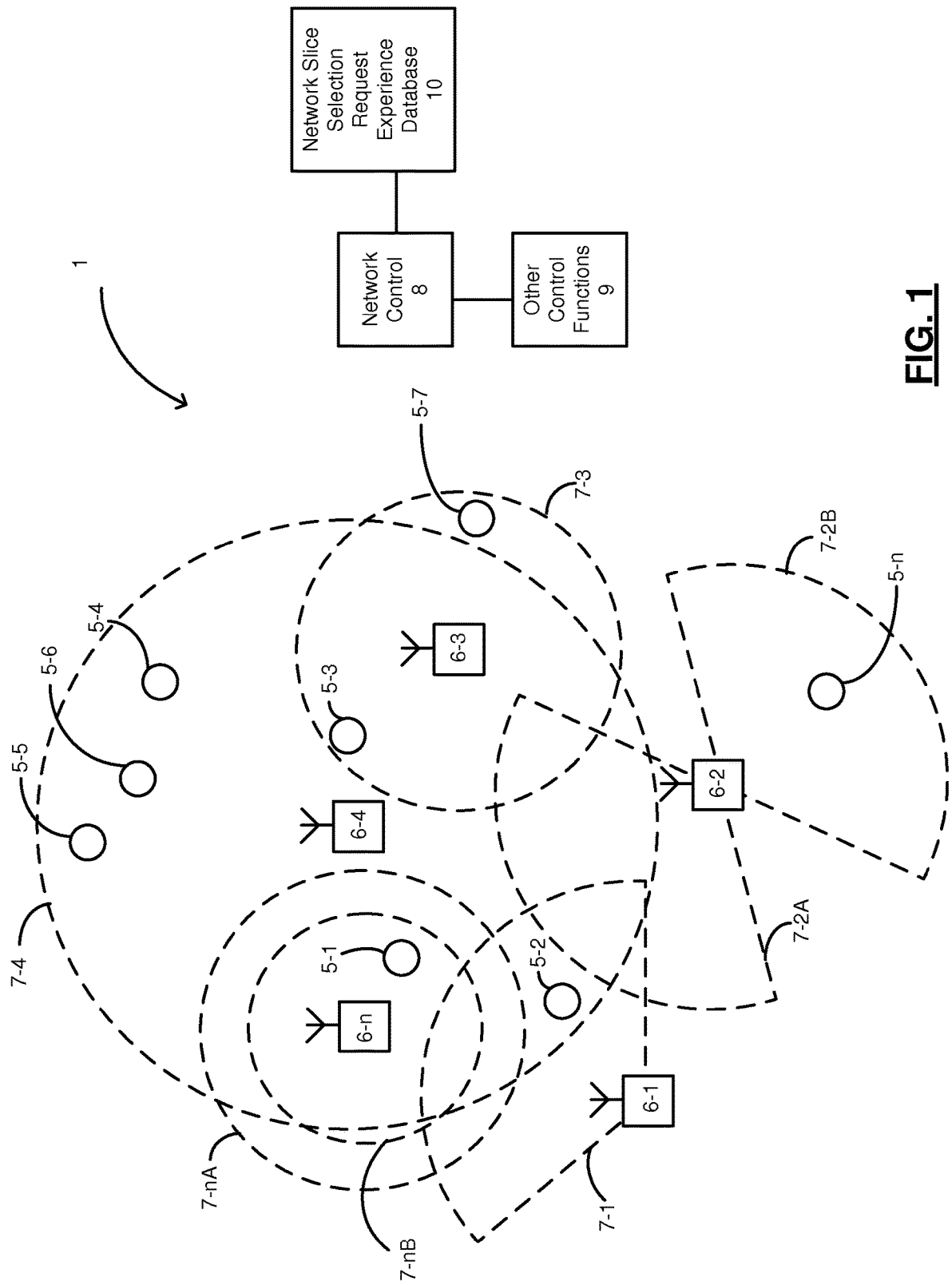
FIG. 1 is an example of a mobile telecommunications radio access network within the context of which various operations and processes described herein may be performed.

In the description and figures, like reference numerals refer to like elements throughout.

Various methods and apparatuses are described in detail below, by way of example only, in the context of a mobile telecommunications radio access network 1, such as that illustrated in FIG. 1. The network 1 comprises one or more access points or base stations (eNodeBs, eNBs) 6-1 to 6-*n* (generally referred to by numeral 6). Only a small number of eNBs 6 are shown in FIG. 1, but a radio access network may typically comprise thousands of eNBs 6. Together, the eNBs 6 may provide radio coverage to one or more user equipment (UE) 5-1 to 5-*n* (generally referred to by numeral 5) over a wide geographical area. The UEs 5 are thus configured for bi-directional wireless communication with one or more of the eNBs 6, via any suitable protocol.

Each eNB 6 operates one or more cells, which are denoted in FIG. 1, for illustrative purposes only, by the dashed circles 7-1 to 7-nA and 7*n*-B or sectors thereof (generally referred to using numeral 7). Although most of the coverage areas of the cells are shown illustratively as circles in FIG. 1, in reality, the coverage area of each cell depends on the transmission power and the directionality of the antenna (or antennas) by which the cell is operated. The coverage area of each cell may also depend on obstacles (such as buildings) which are in the vicinity of the eNB 6, carrier frequency and channel propagation characteristics etc.

The configuration of the coverage area of the cells 7 may be selected so as to serve UEs 5 in a particular area while not providing coverage to other areas. For instance, the configuration of a coverage area of a cell may be selected so as to provide coverage for an area in which users are commonly present while not providing coverage for areas in which users are seldom present. For instance, in FIG. 1, the first cell 7-1 operated by the first eNB 6-1 is depicted as only a sector of a circle. In one extreme example, an eNB 6 may be configured to provide coverage (via a cell) up and down a road but not either side of the road.

As mentioned above, a single eNB 6 may, in some examples, provide two or more cells. For instance, a first cell 7 may be provided in a first direction from the eNB 6 while a second cell 7 may be provided in a different direction. In FIG. 1, this is illustrated by the second eNB 6-2 which is shown as operating two different cells 7-2A and 7-2B.

The eNBs 6 may utilise different radio interfaces, for instance any of wide area, centimetre-wave (cmW) and millimetre-wave (mmW) bands. For instance, in FIG. 1, the first, second and fourth eNBs 6-1, 6-2, 6-4 may utilise a wide area interface, the third eNB 6-3 may utilise a cmW interface, which has a smaller range of coverage, and the nth eNB 6-*n* may utilise a mmW interface which has a coverage area that is smaller still. In some examples, a single eNB 6 may operate multiple cells each having a different carrier frequency. This can be seen in FIG. 1 in respect of the n$^{th}$ eNB 6-*n* which is operating a first cell 7*n*-A having, for instance, a cmW carrier frequency and a second cell 7-nB having, for instance, an mmW carrier frequency.

As discussed in the background section, control functions 8, 9 of the network 1, which may be a 5G network, are configured to partition the physical network into multiple different network slices (or virtual networks). The network slices may be controlled and managed by a respective third party known as a tenant and may be associated with a particular service offered by that tenant.

The control functions 8, 9 may include a network control function 8, which may be, for instance, a CCNF. The control functions 8, 9 may additionally comprise "other functions" 9, which may include, for instance, one or more of a subscription, access and admission network control function and a quality of service (QoS) network control function. The control functions 8, 9 are configured to receive information from and to send information to the UEs 5 via the eNBs 6 and the network backhaul (which is not shown in FIG. 1).

As will be explained in more details below with regard to FIGS. 2 to 6, the UEs 5 are configured to send a network slice selection request to the network control function 8 in order request access to a network slice/service. The identity of the slice/service to which access is requested may be indicated in the request. As discussed above, the network service/slice to which access is sought may be selected from one or more network service/slices which are indicated by the control functions 8, 9 to the UE 5 as being available. As used, herein unless explicitly specified, the term "network slice selection request" may be understood to encompass both initial network slice selection requests and network slice reselection requests.

The network slice selection request includes information indicative of a reason for making the network slice selection request. The information indicative of the reason for making the network slice selection request may, for instance, indicate one or: that the request is an initial slice request, that the current slice by which the UE is being served is expected soon to be unreachable/out of range, that the current slice does not satisfy the requirements of the UE 5 (or of the application of the UE) or that the UE 5 has detected a preferable network slice.

By indicating the reason for which the network slice selection is being made, the network is able to take this information into account when determining whether or not to grant the network slice selection request. Put another way, the network control function 8 may be configured to determine the response to the network slice selection request based on the information included in the network slice selection request that is indicative of the reason for making the network slice selection request.

For example, in the event that a received request indicates that the request is being made because the UE's current slice is expected soon to be unreachable/out of range (or put another way, the UE is at the edge of the current slice), the network control function 8 may determine that the network slice selected in the request serves the same area as the current network slice and so it would not be worthwhile granting the request for the selected network slice. As such, the request may be denied (or rejected).

The information indicative of the reason for the request may be included as one or more data elements in already defined/utilised messages. For instance, the information may be included in attach request messages (when the request is an initial network slice selection request) and in mobility management (MM) request messages (when the request is a network slice reselection request). In some examples (e.g. in 5G), the reason for the request may be included a radio resource control message (for instance along with NSSAI parameters).

The network control function 8 may be configured to, when it is decided to deny a received network slice selection request, include in a message of response to the network slice selection request, information indicative of a reason for denying the request for selection of the network slice. The UE may then use this information when selecting a different network slice to request or when determining to stick with its current slice. The message of response may, in some examples, be a response to an MM message or a response to an attach message. In other examples, it may be in the form of a system information block (SIB) message.

As with the information identifying the reason for making the request, the information indicative of the reason for denying a request may be included as one or more data 1*o* elements in an already defined message. For instance, the information may be included in attach request response messages (e.g. when the request was an initial network slice selection request) and in mobility management (MM)

request response messages (e.g. when the request was a network slice reselection request).

The information indicative of the reasons for denying a network slice selection request, may indicate, for instance, one of: that the UE has insufficient capability to access the selected network slice, that the UE is not allowed (e.g. by network policy) to access the selected network slice, that the selected slice is not any more suitable than the current network slice, or that the network (or the slice tenant) will address the UE's requirements using the current network slice (e.g. by scaling out the current network slice or by performing traffic management in respect of the current network slice).

The provision of the information indicative of the UE's reason for making a network slice selection request (and also the network's reason for denying a request) and the use of this information (e.g. when determining whether to grant or deny the request) may serve to reduce the number of slice reselections that would most ultimately fail. As such, the reliability of the network may be improved. In addition, it may also improve performance statistics for the network, for example, by reducing the number of failed handovers and service interruptions. In summary, the provision and use of this information may improve the performance and reliability of the network and thereby improve the end user experience.

In addition to providing information indicative of the reason for making the network slice selection request, the UE 5 may further provide information indicative of the context in which the request was made. For instance, when the request is a network slice reselection request, information indicative of an attribute for which a predetermined requirement is not satisfied by a current network slice may be included. Attributes which may be indicated may include, for instance, QoS or QoE (quality of experience) characteristics. These may include characteristics such as data speed, data capacity, reliability (e.g. bit error rate) or any other performance metric.

As well indicating the attribute, information indicative of a measure of the attribute for which the predetermined requirement is not satisfied by the current network slice may be included in the request. This may take any suitable form such as, but not limited to, one or more of: the average or standard deviation of the attribute over a particular time period, a value of a function of multiple different contributing factors, which may include the attribute, and a minimum value of a series of measured values of the attribute. In addition, the request may indicate the type of the measure of the attribute (i.e. whether it is a standard deviation, an average, a minimum measured value, a function etc.).

In addition or alternatively to providing the information indicating the measure of the attribute, the network slice selection request may include information indicative of the predetermined requirement that is not satisfied by the current network slice. This may include, for instance, an indication of a limit or threshold value that has or has not been surpassed. For instance, it may include an indication of a minimum data speed requirement (e.g. ≥X Mbps on average for Y seconds) that is not being satisfied.

As will also be explained in more detail with respect to FIGS. 2 to 6, the network control function 8 may be configured to collect data in respect of received network slice selection requests and to use this collected data when determining whether or not to grant future network slice selection requests. The collected data may include, for instance, an indication as to whether or not a network slice reselection resulting from a granted network slice selection request was successful. For instance, the network control function 8 may identify previous network slice selection requests for which the circumstances were similar to a currently received request and may use the success (or otherwise) of those similar requests to determine whether to grant or deny the currently received request.

The network control function 8 may therefore be configured to create a data entry describing a received network slice selection request. The created data entry, as well as other data entries describing previously-received network slice selection requests, may be stored in a network slice selection request experience database 10 (see FIG. 1), which is accessible by the network control function 8.

The data entry may include information indicative of whether the network slice selection request was granted/accepted or denied/rejected. At least some of the information that is included in the network slice selection request (e.g. at least some of: the reason, the attribute, the measure of the attribute and the limit on the attribute) may also be included in the data entry. In addition, when the network slice selection request was granted, the network control function 8 may determine whether or not the network slice selection has been successful and may include an indication of this in the data entry corresponding to the request.

Determining whether the network slice selection has been successful may include, for instance, starting a timer after granting access to a network slice in response to a network slice selection request. The timer may then be monitored and, if the timer expires without a network slice reselection request having been received, it may be determined that the network slice selection has been successful. If, however, a network slice reselection request is received prior to expiry of the timer, it may be determined that the network slice selection has been unsuccessful.

The above and other functionalities of the UE 5 and network control function 8 will now be discussed in more detail in relation to FIGS. 2 to 6.

Figure 2:
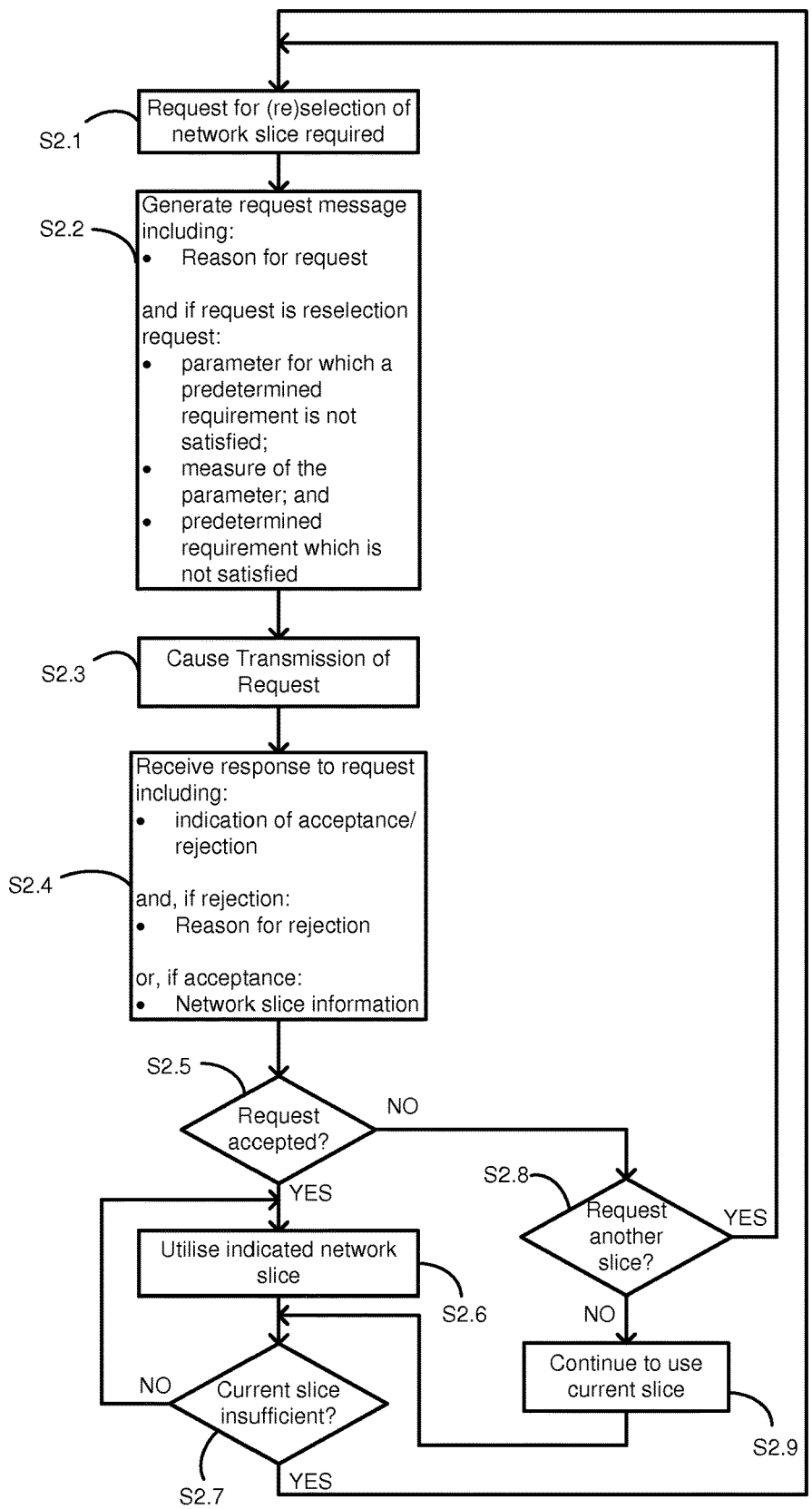
FIG. 2 is a flow chart illustrating various operations which may be performed by a UE operating within a radio access network such as that of FIG. 1.

FIG. 2 is a flow chart illustrating various operations which may be performed by a UE 5 operating in a network 1 such as described above with reference to FIG. 1.

In operation S2.1, the UE 5 determines whether a request for selection of a network slice is required. This determination may be based on a number of different factors.

For instance, it may be determined that a request for selection of a network slice is required when a particular application, which requires network access, has been initiated on the UE. This may be an example of initial network slice selection. Initial network slice selection requests (which may be in the form of "attach requests") may occur when the UE 5, or an application running on the UE, is not currently being served by a network slice.

It may be determined that a request for reselection of a network slice (which may be in the form of a mobility management (MM) request) is required in a number of situations. For instance, it may be determined that the UE is likely to leave the coverage area of the current network slice, that the characteristics of the current network slice are not meeting the requirements of the UE (or the application), or that the UE has recognised that a preferable network slice (e.g. one that provides better service or service that is more appropriate for the needs of the UE/application) is available.

As will be appreciated, determinations that network slice reselection is required may be performed on the basis of measurements of the performance characteristics (or attributes) of the current network slice. More specifically, such determinations may be performed on the basis of comparisons of the measurements of the performance characteristics with pre-defined limits for the specific application being run by the UE 5.

Although not shown in FIG. 2, in addition to determining that a network slice selection request is required, the UE 5 may also select the network service/slice to which it intends to request access. As discussed previously, the network service/slice may be selected from one or more services/slices that are indicated by the network as being available.

In response to determining that a network slice selection request is required, operation S2.2 may be performed.

In operation S2.2, the UE 5 generates a network slice selection request message which includes the reason for which the request is being made. In some examples, the network slice selection request may additionally include information identifying the network service/slice to which access is being requested. This information may be in the form of, for instance, one or more multidimensional descriptors (MDDs) or one or more Network Slice Selection Assistance Information (NSSAI) parameters either of which may identify the UE's preferred network slice.

When the UE 5 (or the application thereon) already has access to a current network slice, and so the request is a network slice reselection request, the request may additionally include information indicative of a attribute/characteristic of the current network slice for which a requirement (e.g. a minimum value) is not being fulfilled. In such instances, the request may additionally include a measure of the characteristics/attribute (e.g., as observed by the UE) and/or an indication of the requirement (e.g. the minimum value), which is not being fulfilled. The measure of the characteristics may also indicate the nature or type of the measurement (e.g. that it is a standard deviation over a time x, or an average over a time y). By sending this information, the UE 5 is informing the network control function 8 as to any problems it is experiencing with the current network slice and also how the problems are being detected.

Non-limiting examples of data elements, which may be included in a network slice selection request generated by the UE 5 for transmission to the network, are set out below:
Reason Type ID.

The Reason Type ID data element may be a unique ID that identifies the type of a reason for which the UE is sending the network slice selection request.

Non-limiting examples of reason types which may be indicated may include: "initial slice selection" (this indicates that the UE (or application) is not currently being served by a network slice); "soon to be leaving coverage of current slice" (this indicates that the UE is likely to be moving out of range of the current network slice); "current slice unsatisfactory" (this indicates that one or more characteristics of the current network slice are not meeting requirements); and "preferable slice detected" (this indicates that the UE has determined that a better or more appropriate network slice is available).

In some examples, when the reason for the request is "initial slice selection", the inclusion of a Reason Type ID Data Element indicating this may not be required. Instead, the network control function may implicitly determine the reason as being "initial slice selection" based on the type of the message received. For instance, if the message is an attach request, the network control function may understand the reason for the request as being "initial slice selection". In examples such as this, the information indicative of the reason for making the network slice selection request (which is included in the request) may be the indication that the message is an attach request. In other examples, the network control function may understand any network slice selection request which does not include a Reason Type ID data element as being an initial slice selection.

Sequence Number ID

The sequence number ID data element may be a unique ID that, together with Reason Type ID, may identify the individual reason instance in a slice selection request. The sequence number ID data element may be particularly beneficial when there is more than one reason for which the request is being made.

Attribute

The Attribute data element may indicate an attribute/characteristic of the current network slice in respect of which one or more requirement is not being met.

The attribute indicated by the Attribute data element should be commonly understood by the UE 5 and network control function 8. Examples of attributes which may be indicated by the Attribute data element may include (but are not limited to) data speed and slice capacity, delay, priority, error rate, resource type (e.g. GBR or Non-GBR) etc.

Measure

The Measure data element may indicate the measurement based on which the UE 5 determined that a particular requirement of the current network slice is not being fulfilled.

The Measure data element may also indicate the nature of the measurement. For instance, may indicate that the measurement is one of: the average value of the attribute (indicated by the attribute data element) over a time period x, the standard deviation value of the attribute over time period z, a function which is dependent on one or more different factors, and a minimum of z (e.g. consecutively measured) measured values of the attribute.

Limit

The Limit data element may indicate the limit in respect of the attribute (indicated by the Attribute data element) that is not being fulfilled. The limit may, for instance, indicate a required range of values for the characteristic of the network slice. For example, the Limit data element may indicate that the unfulfilled requirement of current network slice is that the data speed attribute is should be "greater than X Mbps, on average over Y seconds".

Further Attribute, Measurement and Limit Data Elements

In the event that more than one attributes/characteristic of the current network slice is not meeting requirements, at least one further Attribute data element (and optionally also corresponding Measurement and/or Limit data elements) relating to the other attributes/characteristics may additionally be included in the request.

Returning now to FIG. 2, having generated the network slice selection request, the UE may perform operation S2.3 in which transmission of the request to the network control function 8 is caused. The UE 5 then awaits a response from the network control function 8.

In operation S2.4, a response to the network slice selection request is received. The response includes an indication as to whether the network slice selection request has been granted or denied.

In the event that the network slice selection request has been granted, the response may include information identifying the network slice to which access has been granted. As with the similar information which may be included in the network slice selection request, this information (network slice identification information) may be in the form of one or more MDDs or NSSAI parameters. In some examples in which the network control function 8 grants access to the UE's requested network slice, the information identifying the network slice may simply reflect that included in the network slice selection request. In other examples, however, the network control function 8 may determine not to grant access to the requested network slice, but instead to grant access to a different network slice. This is then identified in the response message by the network slice identification information.

In the event that the network slice selection request has been denied, the response may include information indicating the reason for which the request has been denied. The information may be provided by a Reason Type ID data element similar to that described with reference to the network slice selection request. Reasons for denial of the request, which may be indicated in the response, may include, for instance, that the UE has insufficient capability to access the selected network slice, that the UE is not allowed (e.g. by network policy) to access the selected network slice, that the selected slice is not any more suitable that the current network slice, or that the network (or the slice tenant) will address the UE's requirements using the current network slice (e.g. by scaling out the current network slice or by performing traffic management in respect of the current network slice).

In operation S2.5, the UE may determine based on the received response whether the network slice selection request has been granted. In response to a positive determination, the UE 5 may (in operation S2.6) access and utilise the network slice indicated by the received response.

While utilising the indicated network slice, the UE 5 may determine (in operation S2.7) whether the currently accessed slice is meeting requirements. This may be similar to as described with reference to the determination of operation S2.1.

In response to a negative determination in operation S2.7 (i.e. that the current network slice is not meeting requirements), the UE 5 may return to operation S2.1 in which it is determined that a network slice reselection request is required. In response to a positive determination in operation S2.7 (i.e. that the current network slice is meeting requirements), the UE 5 may return to operation S2.6 and continue to utilise the current network slice.

Returning now to operation S2.5, in response to determining based on the received response from the network control function 8 that the network slice selection request has not been granted, the UE 5 may proceed to operation S2.8.

In operation S2.8, the UE 5 may determine whether to request another network slice/service (or whether to send another network slice selection request). As discussed above, this may be performed based on the information identifying the reason for denial of the request included in the response from the network control function 8 (e.g., the Reason Type ID element). For instance, the UE may determine not to send another request, if doing so is likely to yield a rejection for the same reason as that for which the previous request was denied. For example, if the response to the request indicates that the reason for rejection was based on properties of the UE, e.g., "insufficient UE capability", the UE may determine not to send another request. Similarly, the UE may determine not to send another request, if the reason given indicates "not allowed by network policy". Conversely, if the reason indicated is likely to be transitory in nature, the UE might decide that it is worth sending another request.

In response to a positive determination (i.e. a determination that another network slice selection request should be sent), the UE 5 may return to operation S2.1. In response to a negative determination, and assuming that the UE 5 is currently accessing a network slice (i.e. that the denied network slice selection request was not an initial network slice selection request), the UE 5 may continue to operation S2.9 in which it continues to make use of the current networks slice. After this, the UE 5 may proceed to operation S2.7 in which it determines whether the current slice is meeting requirements.

Figure 3:
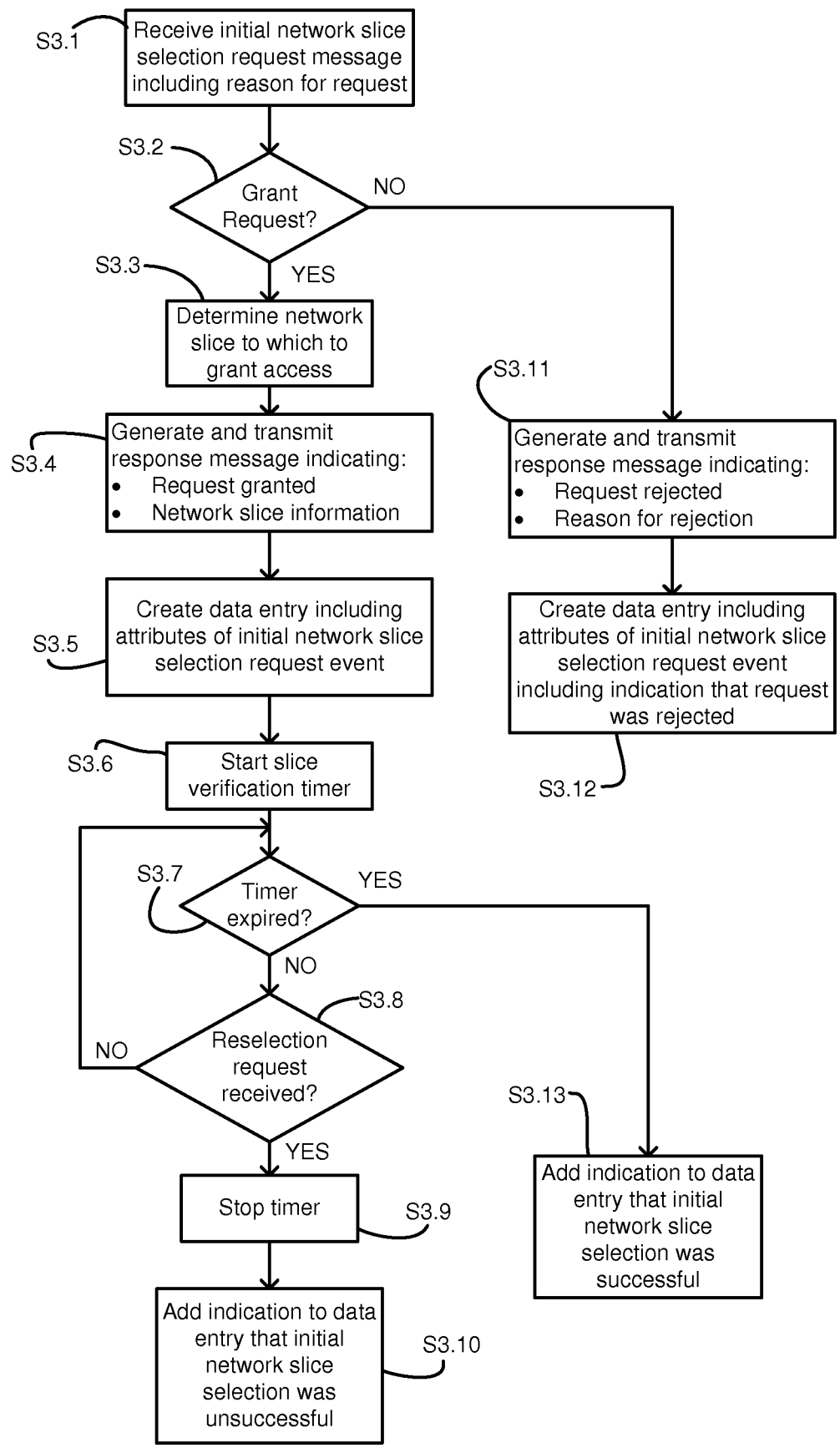
FIGS. 3, 4 and 5 are flow charts illustrating various operations which may be performed by a network control function operating within a radio access network such as that of FIG. 1.

FIG. 3 is a flow chart illustrating various operations which may be performed by the network control function 8 operating in a network 1 such as described above with reference to FIG. 1. More specifically, FIG. 3 illustrates operations for responding to, and for collecting experience data in relation to, an initial network slice selection request.

In operation S3.1, the network control function 8 receives an initial network slice selection request from a UE 5. As discussed above, the request may include information indicative of the reason for which the request has been made, which in this instance indicates that this is an initial network slice selection request. The request may additionally include network slice identification information, which indicates the UE's preferred network slice. As mentioned above, in some instances, no explicit reason may be included in the request, but the absence of a reason may be understood by the network control function 8 to mean that the request is an initial slice request.

In operation S3.2, the network control function 8 determines whether to grant the request. This may be determined in any suitable way, for instance based on a set of rules.

In response to a determination in operation S3.2 that the network slice selection request is to be granted, the network control function 8 proceeds to operation S3.3. In operation S3.3, the network slice to which access is to be granted is determined. This may be, for instance, the slice identified in the network slice selection request (as preferred by the UE), or another network slice which is considered more appropriate by the network control function 8.

Subsequently, in operation S3.4, the response to the network slice selection request is generated and transmitted. As discussed previously, the response may include an indication that the request has been granted and also information identifying the network slice to which access has been granted (e.g. MDDs or NSSAI parameters).

In addition to generating and transmitting the response message to the UE 5, the network control function 8 may also create a data entry, which includes data elements that are descriptive of the network slice selection request event. The data entry may be stored in a network slice selection request experience database, which may be accessible to the network control function 8. As will be discussed in more detail below, the data entry stored on the network slice selection request experience database may be used to determine whether to grant or deny future network slice selection requests.

The data elements which may be included in the data entry for a received request may include, for instance, at least some of the information received in the network slice selection request including the information indicative of the reason for making a request (e.g., the Reason Type ID data element).

The data elements may additionally include any combination of one or more other data elements of the network slice selection request listed in Table 1 below. The data elements may generally fall into one of three categories: context data elements, which together may define the context in which the request was made, action data elements, which may define how the response to the request was determined, and result data elements which may define the result of the network slice selection request.

TABLE 1

| Request Context data elements | |
|---|---|
| Cell ID | A set of one or more cell IDs currently being accessed by the UE (e.g. a global cell ID in LTE) |
| Cell Tech | A set of radio technologies that the currently accessed cells are using (e.g.802.11g, 5G 3500 mMIMO, LTE 1800 etc.) |
| Cell Type | A set of cell types for the currently accessed cells (e.g. micro, macro, pico etc.) |
| Cell Antenna | A set of antenna modes to which the accessed cells belong (e.g. may define a number of sectors per site and MIMO type) |
| Cell Traffic Pattern | A set of cell traffic patterns to which the accessed cells belong (e.g. may define a number of active UEs, types of applications used, traffic volume per QoS category and cell load) |
| Reason Type ID | May correspond to the Reason Type ID data element included in the received network slice selection request or may be inferred from the request |
| UE ID | An identifier to identify the UE uniquely and globally (e.g. an IMSI) |
| UE Model | May contain UE product name (e.g. iPhone 7 ®), firmware version, and/or software version |
| Active UE Application | May indicate data relating to one or more active applications that are expected to use the requested network slice (e.g. may include service types and QoS requirements) |
| Requested Slice ID | May indicate the slice requested by the UE |
| Requested Slice Type | May indicate the service provided by the requested slice (e.g. one of healthcare, robotic communication, premium communication, media, mobile, broad, basic etc.) |
| Action data elements | |
| Action Type | This may define whether an experience-based determination or a rule-based determination was made in response to the request. |
| Result data elements | |
| Assigned slice ID | May indicate the slice assigned to the UE (Similar to Requested Slice ID) |
| Assigned slice type | May indicate the slice type of the slice assigned to the UE (Similar to Requested Slice Type) |
| Slice Successful | Indicates that the assigned slice serves the UE successfully |
| Slice Failed | Indicates that the assigned slice fails to serve the UE successfully |
| Slice Rejected | Indicates that the request was rejected/denied and may include the Reason Type ID data element included in the response provided to the UE |
| Slice Approved | Indicates that the request for assignment of a network slice was granted |

Regarding the UE Model data element in Table 1, this data element may be beneficial since some UE models may find a particular slice satisfactory, while other UE models may not.

The active UE Application data element may in some instances be omitted, since the application information of the UE may not be known to the network. For instance, this data element may only be included in the data entry when the UE provides this information to the network.

With regard to the Requested Slice ID data element and the Requested Slice Type data element, one or both of these may provide the network with information which enables the network to determine similarities between given network slices. These data elements may be referred to as "slice information" data elements.

The Assigned Slice ID data element and the Assigned Slice Type data element may, in some examples, be omitted if the network control function 8 assigned the requested slice to the UE. In other examples, Requested Slice ID data element and the Requested Slice Type data element may be omitted (for instance, it may not be beneficial to record which slice was requested, only which slice was assigned).

As will also be appreciated, some of the data elements (e.g., some of the result data elements) may not be able to be included in the data entry initially, e.g. in operation S3.5, since they are not yet known. These include, for instance, the Slice Successful and Slice Failed data elements.

Returning now to FIG. 3, subsequent to generating and transmitting the response message, the network control function 8 may start a slice verification timer in operation S3.6. The slice verification timer may be utilised to determine whether or not an assignment of a particular network slice in response to a network slice selection request has been successful.

The duration of the slice verification timer may depend on the type of the network slice that has been assigned to the UE. Depending on the type of the network slice that has been signed, the value of the slice verification timer may be anything from one or more seconds to one or more days.

In operation S3.7, the slice verification timer is monitored to determine if the timer has expired.

In operation S3.8, incoming slice reselection requests from the UE are monitored.

If it is determined that the timer has expired without a slice reselection request having been received from the UE 5, the network control function 8 proceeds to perform operation S3.13.

In response to determining that the timer has expired without a slice reselection request having received from the UE, the network control function 8 (in operation S3.13) adds a data element to the created data entry (e.g., the Slice Successful data element), thereby to indicate that the assignment of the network slice in response to the received request was successful.

If it is determined that a reselection request from the UE 5 has been received before the timer has expired, the network control function 8 proceeds to perform operation S3.9 in which the timer is stopped.

In response to determining that a reselection request from the UE has been received before the timer has expired, the network control function 8 proceeds to operation S3.10. In operation S3.10, the network control function 8 adds a data element to the data entry created in operation S3.5 (e.g., the Slice Failed data element), thereby to indicate that the assignment of the network slice in response to the received request was unsuccessful.

In some instances, the reselection request received in operation S3.8 may be handled as described below with reference to FIG. 4.

Returning now to operation S3.2, in response to determining that the received network slice selection request should be denied, operation S3.11 may be performed. In operation S3.11, the response message is generated and transmitted to the UE and, for instance as described with reference to operation S2.4 of FIG. 2, includes an indication that the request has been rejected and also information indicative of the reason for which the request has been rejected.

As well as rejecting the request and transmitting the response, the network control function 8 may also (in operation S3.12) create a data entry corresponding to the received request. The data entry includes an indication that the request was rejected (e.g., in the form of the Slice Rejected data). In addition, the data entry may include any relevant ones of the data elements shown in Table 1.

Figure 4:
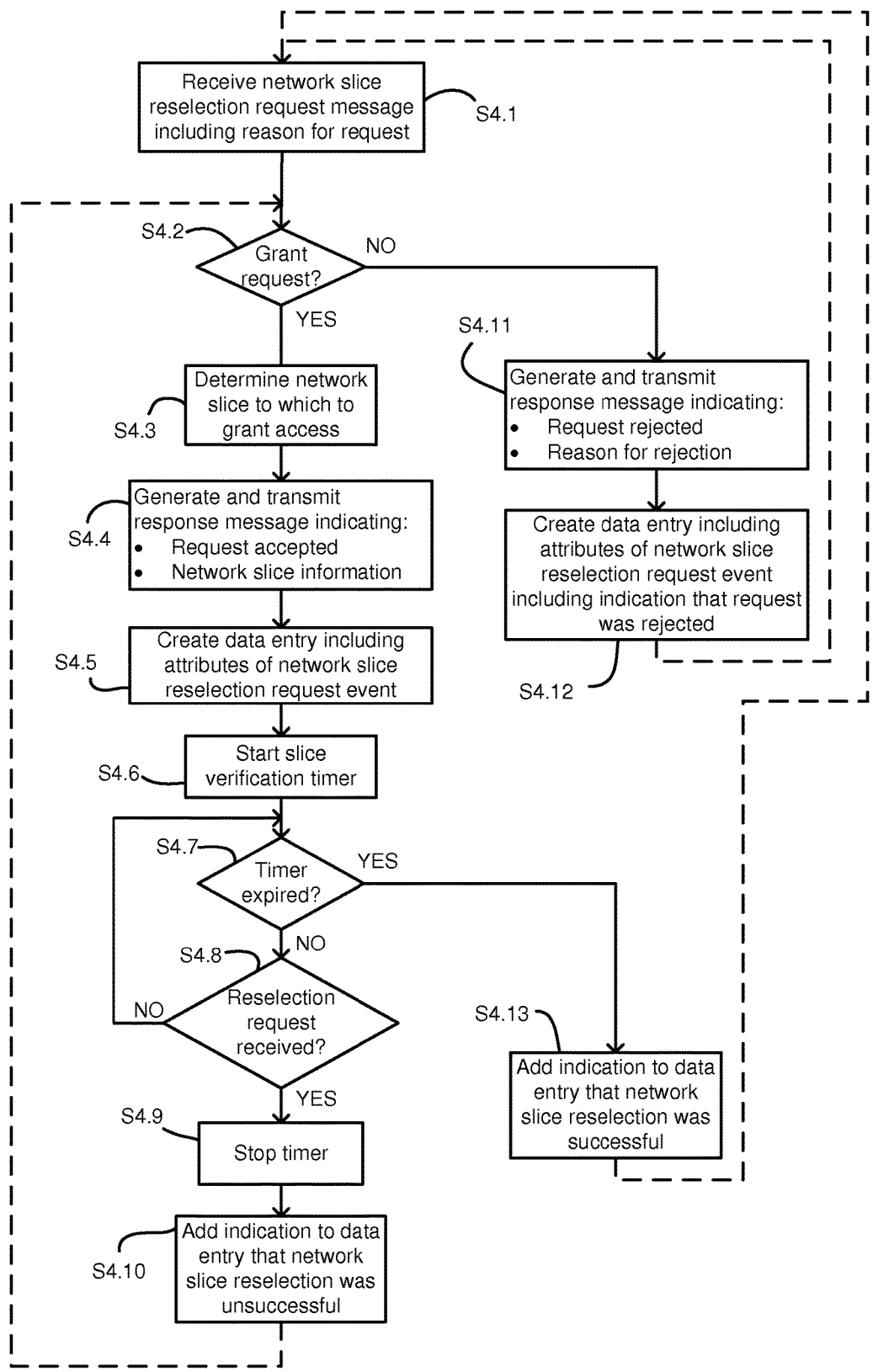

FIG. 4 is a flow chart illustrating various operations which may be performed by the network control function 8 operating in a network 1 such as described above with reference to FIG. 1. More specifically, FIG. 4 illustrates operations for responding to, and for collecting experience data in relation to, a network slice reselection request.

In operation S4.1, the network control function 8 receives a network slice reselection request from a UE 5. As discussed above, the request includes information indicative of the reason for which the request has been made. The request may additionally include network slice identification information, which indicates the UE's preferred network slice.

In operation S4.2, the network control function 8 determines whether to grant the request. This may be determined based on a set of rules and/or data relating to previously received requests, which may be stored in the network slice selection request experience database. This will be described in more detail with reference to FIG. 5.

In response to a determination in operation S4.2 that the network slice reselection request is to be granted, the network control function 8 proceeds to operation S4.3. In operation S4.3, the network slice to which access is to be granted is determined. This may be, for instance, the slice identified in the network slice reselection request (as preferred by the UE), or another network slice which is considered more appropriate by the network control function 8.

Subsequently, in operation S4.4, the response to the network slice selection request is generated and transmitted. As discussed previously, the response includes an indication that the request has been granted and also information identifying the network slice to which access has been granted (e.g. MDDs or NSSAI parameters).

In addition to generating and transmitting the response message to the UE 5, the network control function 8 also creates a data entry (which may be stored in the network slice selection request experience database), which includes data elements which are descriptive of the network slice reselection request event. The data elements may include, for instance, at least some of the information received in the network slice selection request including the information indicative of the reason for making a request (e.g., the Reason Type ID data element). The data elements may additionally include any combination of one or more other elements listed in Table 1, and described with reference to FIG. 3.

In addition to any combination of those data elements shown in Table 1, the data entry corresponding to the network slice reselection request may additionally include one or more additional Context Request data elements. These may include at least one Attribute data element, which is received in the reselection request (as described above with reference to FIG. 2). Similarly, the additional Context Request data elements may include one or more Measure and/or Limit data elements, which may also be received in the reselection request.

In addition or alternatively, the additional Context Request data elements may include a Current Slice ID data element, which may indicate the network slice that is currently being accessed by the UE when the network slice reselection request is transmitted. A corresponding Current Slice Type data element (which is similar to the Requested Slice Type data element described with reference to Table 1) may also be included in the data entry. These may be referred to as slice information data elements (along with the Requested Slice ID data element and the Current Slice Type data element).

After the data entry is created, operations S4.6 to S4.10 and S4.13 may be performed (as appropriate). These operations may be similar to operations S3.6 to S3.10 and S3.13 described with reference to FIG. 3.

In response to determining in operation S4.2, that the reselection request should not be granted, operations S4.11 and S4.12 may be performed. These may be substantially as described with reference to operations S3.11 and S3.12 with reference to FIG. 3. However, the data entry created in operation S4.12 may include the additional Request Context data elements described with reference to operation S4.5.

As will be explained in more detail below, particularly with regards to FIG. 5, the data entries created in the processes of FIGS. 3 and/or 4 may subsequently be used when performing experience-based determinations as to whether to grant or deny received network slice reselection requests.

In the above description in relation to FIGS. 3 and 4, it is described that a positive response to a network slice selection request (in which the UE is granted access to a network slice) is determined as being unsuccessful if a network slice reselection request is received prior to expiry of the slice verification timer. However, this may not always be the case. For instance, if the slice verification timer has too long a duration, it is possible that a network slice reselection request may be sent by the UE because it is moving out of the coverage area of the network slice (which may be indicated by the reason type ID in the network slice reselection request). As such, if a reselection request indicating the reason as "soon to be leaving coverage of current slice" is received prior to expiry of the timer, the previous selection request may not be marked in the data entry as unsuccessful. Instead, the previous selection request may be marked in the data entry as successful. As will of course be appreciated, this may not be the case when the UE is not permitted to access the requested network slice. In a situation such as that, the data entry for the request will indicate "slice rejected".

In some examples, the duration of the slice verification timer (as applied in the processes of either of FIGS. 3 and 4) may be determined based on a geo-location and geo-speed of the UE 5. The duration of the slice verification timer may have an inverse relationship with the geo-speed of the UE 5. For instance, if the UE is determined to be moving quickly, the duration of the slice verification timer may be set to a lower value and vice versa. Similarly, the duration of the slice verification timer may have a direct relationship with the distance from the cell coverage boundary. For instance, if the distance from the cell coverage boundary is lower, the duration of the slice verification timer may be set to a lower value or vice versa. In these examples, the network control function 8 may determine a rough geolocation based on the current cell ID to which the UE is attached. The geo-speed may be estimated for instance based on the timing advance or GPS coordinates. Setting the timer in this way may reduce occurrences of reselection requests being received before the timer has expired.

Figure 5:
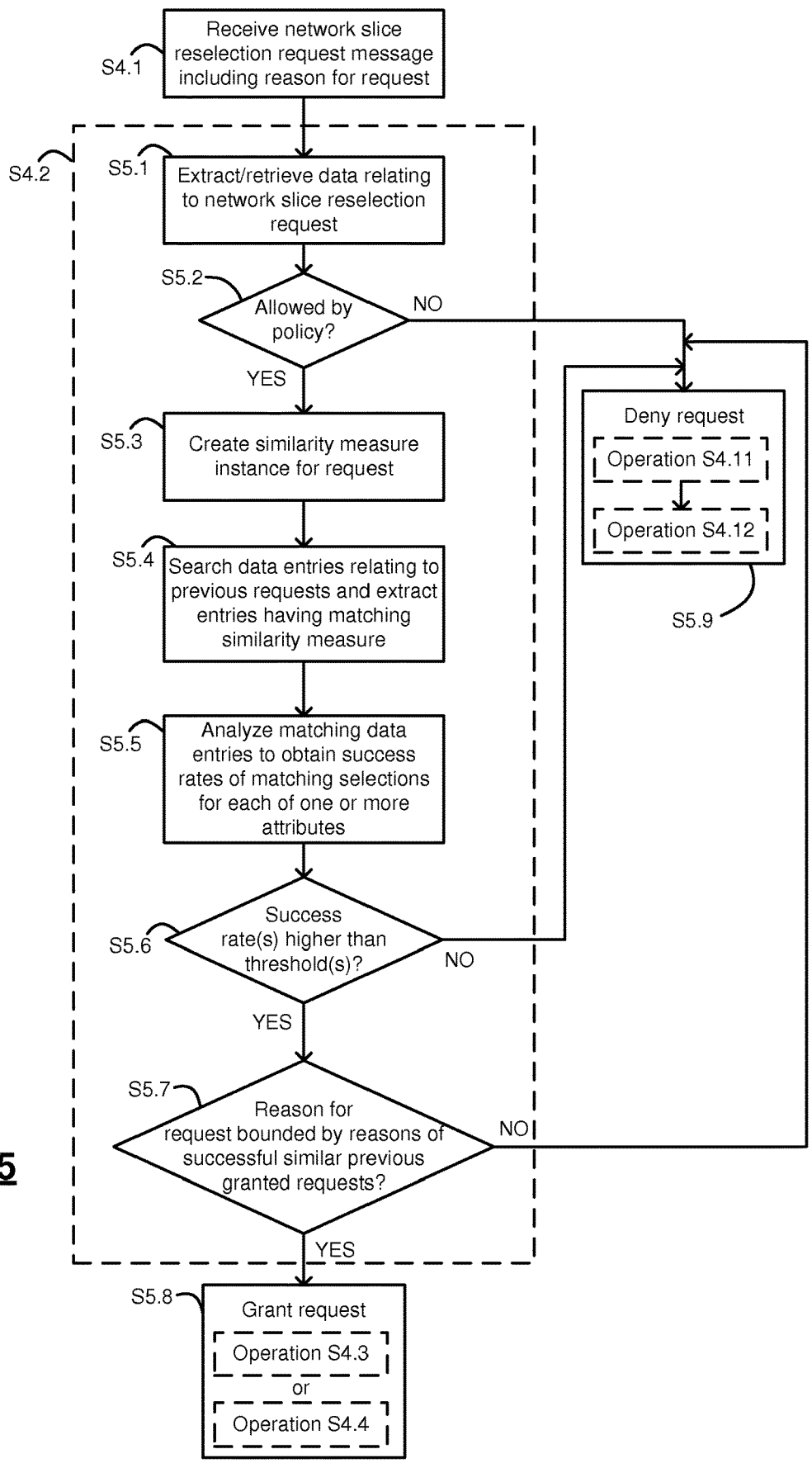

FIG. 5 is a flow chart illustrating various operations which may be performed by the network control function 8 (e.g. the CCNF) when determining whether to grant or deny a network slice reselection request. More specifically, FIG. 5 illustrates a determination based on experiences of previously received requests, which may be referred to as "experience-based determination".

In operation S5.1 (having received a network slice reselection request in operation S4.1), the network control function 8 obtains relevant data relating to the network slice selection request. Some of the obtained data may be extracted from the network slice reselection request. Such data may include the information identifying the reason for the network slice selection request (e.g. the Reason Type ID data element). In addition, one or more of the following may be extracted if they are included in the request: the information identifying the attribute(s)/characteristic(s) of the current slice which does not meet requirements (e.g. the Attribute data element(s)), the information indicative of the measurement(s) based on which it is determined that a particular requirement of the current network slice is not being fulfilled (e.g. the Measure data element(s)) and the information indicative of the limit(s) that is not being satisfied by the characteristic(s) (e.g. the Limit data element(s)).

Other data which may also be obtained in operation S5.1, either from the received request or from a database that is accessible by the network control function 8, may include any combination of the Request Context data elements described with reference to Table 1 above, and with reference to operation S4.5 of FIG. 4.

In operation S5.2, the network control function 8 determines whether one or more policies associated with the network allow it to grant access to the requested network slice. For instance, some network slices may be reserved for particular application and/or UE types and so, if a UE requests access to a network slice that it is not permitted to access, the request may be denied. As will be understood from the below description in relation to FIG. 6 (particularly, operations 6.2, 6.3 and 6.4), the network control function 8 may make this determination on the basis of a message received from the other control functions 9, which may be responsible for implementing the policies associated with the network.

In response to determining in operation S5.2 that the UE is not allowed to access the requested network slice, the network control function 8 may deny the request in operation S5.9. Denying the request may include performance of operations S4.11 and S4.12 of FIG. 4.

In response to determining in operation S5.2 that the UE is allowed to access the requested network slice, the network control function 8 may proceed to operation S5.3.

In operation S5.3, the network control function 8 creates a similarity measure instance for the received network slice reselection request. The similarity measure (SM) may include one or more of the following data elements: slice information (Slice Info) data elements (e.g. Current Slice ID, Current Slice Type, Requested Slice ID, Requested Slice Type), the Cell Tech data elements, Cell Type data elements, Cell Antenna data elements, Cell Traffic Pattern data elements and Active UE Application data elements. Put another way, the similarity measure may be defined as the following:

SM={Slice Info, Cell Tech, Cell Type, Cell Antenna, Cell Traffic Pattern, Active UE Application}

The similarity measure may be used by the network control function 8 to match the received request with previous requests (both initial requests and reselection requests). As such, in operation S5.4, the network control function 8 searches the data entries relating to previous network slice selection requests (for instance, as created in any of operations S4.5, S4.12, S3.5, and S3.12) to identify similar requests. For instance, similar requests may be previous requests for which the similarity measure exactly matches that of the received request.

As will be appreciated, there may be some tolerance in the degree to which the similarity measure of the received request matches that of a previous request in order for the previous request to be considered similar (and so to be taken into account when deciding whether to grant or deny the received request). For instance, the matching of some of the data elements in the similarity measure may be optional. Alternatively, it may be required that only a proportion of the elements of the similarity measure should match (e.g. any X data elements out of the Y data elements defined in the similarity measure). Another way in which the tolerance may be increased is by reducing the number of data elements that are included in the similarity measure.

Subsequent to having extracted the data entries for previous requests having similar similarity measures to that of the received request, the network control function 8 proceeds to operation S5.5. In operation S5.5, the network control function 8 analyses the extracted data entries. More specifically, the network control function 8 may analyse the extracted data entries in order to obtain at least one success rate for similar requests (e.g. the proportion of similar requests for which the assignment of the network slice was determined to be successful, e.g. in operations, S3.13 and S4.13). In some examples, plural different success rates may be determined for each of one or more request context data elements. That is, the success rate may be determined for similar data entries for which a particular request context data element (which was not included in the similarity measure) is the same as that for the currently received request. Such data elements may include, for instance, the Cell ID, the Reason Type ID and the UE Model. As such, the result of operation S5.5 may be plural different success rates, each corresponding to a different request context data element.

In operation S5.6, the network control function 8 determines whether each of the at least one success rate is above a respective success rate threshold. Where plural success rates have been determined, each success rate may have a different threshold. Alternatively, each of the success rate thresholds may be the same.

In response to a negative determination in operation S5.6 (that is, a determination that at least one of the success rates is below its respective threshold), the network control function 8 may proceed to operation S5.9 in which the network slice selection request is denied.

In response to a positive determination in operation S5.6 (that is, a determination that all of the one or more success rates are above their respective thresholds), the network control function 8 proceeds to operation S5.7. In operation S5.7, network control function 8 determines whether the reason for the current request is bounded by the reason for previous similar requests, the responses to which were successful. The determination of operation S5.7 could be said to serve as a filter to exclude some similar (but not, in fact, applicable) experiences from being considered when determining whether or not to grant a network slice reselection request.

In brief, "Reason A is the subset of or bounded by Reason B" means that Reason B is more dominant with its requirement than that of Reason A. If this is true, the fact that the requirements of "Reason B" indicated by the previous request were met by network slice assigned in response to that previous request (i.e. the request was successful) may indicate to the network control function 8 that the same network slice would also meet the requirements of "Reason A" as indicated in the current request.

In more detail, a particular reason for a current request may be the subset of (i.e., be bounded by) a previous request, if all the following conditions are true:
Condition 1: the attributes identified in current request (by the Attribute data elements) are a subset of the attributes identified in the previous request;
Condition 2: the type of the measurement (identified by the Measure data element) of an attribute identified in the current request is the same as the type of the measurement of a corresponding attribute identified in the previous request; and
Condition 3: the limit (identified by the Limit data element) corresponding to the attribute identified in the current request is a subset of the limit corresponding to the same attribute identified in the previous request.

With regard to the Condition 3, the way in which a limit may be a subset of another limit, is illustrated by the following examples. If a first minimal data speed $Limit_i=2$ Mbps (i.e., all speeds below 2 Mbps are not acceptable) and a second minimal data speed $Limit_j=4$ Mbps, the first minimal data speed limit $Limit_i$ is a subset of the second minimal data speed limit, $Limit_j$. Similarly, if first maximal delay $Limit_i=20$ ms (i.e., all delays ≥20 ms are not acceptable) and a second maximal delay $Limit_j=5$ ms, the first maximal delay $Limit_i$ is a subset of the second maximal delay $Limit_j$.

Put in mathematical terms these conditions may be defined as follows:

$A::\{Attribute_1, \ldots, Attribute_n\} \subseteq B::\{Attribute_1, \ldots, Attribute_m\}$, where $n \leq m$;   Condition 1

$A::Attribute_i::Measure = B::Attribute_j::Measure$, where a unique $i(i \in \{1,2,\ldots,n\})$ is for a unique $i(j \in \{1,2,\ldots,m\})$; and   Condition 2

$A::Attribute_i::Limit \subseteq B::Attribute_j::Limit$,   Condition 3

In some examples, in order for a positive determination to be reached in operation S5.7, all reasons for the current request should be bounded by corresponding reasons for previous similar requests. In other examples, a certain number, or proportion, of reasons for the current request must be bounded by corresponding reasons for previous similar requests.

In response to a positive determination in operation S5.7, the network control function 8 proceeds to operation S5.8 in which the request is granted. Granting the request may include performing one or both of operations S4.3 and S4.4 of FIG. 4. By requiring a positive determination in operation S5.7 in order to grant the request, the network control function 8 can be confident that particular network slice that is assigned to the UE in response to the request is likely to fulfil the requirements of the UE/application.

In response to negative determination in operation S5.7, the network control function 8 may proceed to operation S5.9 in which the network slice selection request is denied.

Figure 6:
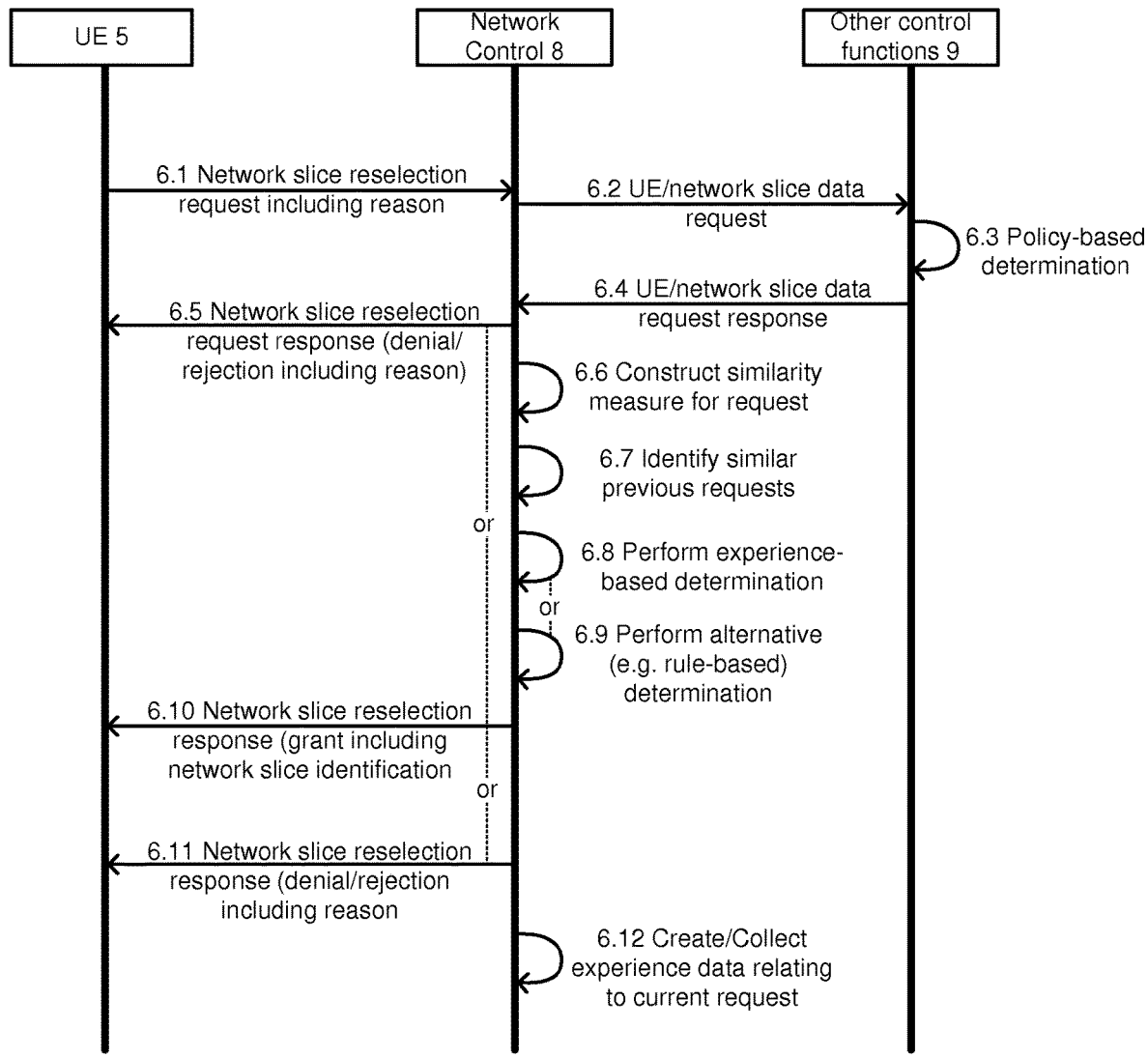
FIG. 6 is a message/process flow diagram illustrating operations which may be performed by various entities within a radio access network such as that of FIG. 1.

FIG. 6 is an example of a message flow diagram illustrating the flow of messages between various entities in a radio access network, such as that of FIG. 1, in order to provide the above-described functionality. The diagram illustrates three of the constituent entities of the network, specifically the UE 5, the network control function 8, which may be, for instance, the CCNF, and various other control functions 9, such as subscription, access and admission control and QoS operator control.

In operation 6.1, the UE 5 generates a network slice reselection request, which is transmitted through the network to the network control function 8. As discussed above, the network slice reselection request, which may be referred to as a mobility management (MM) request includes information indicative of the reason for which the request is being made. In addition, the network slice selection request may include information identifying the network slice for which access is being requested. Such identifying information may be in the form of MDDs or NSSAI parameters.

Upon receipt of the request at the network control function 8, the network control function 8 (in operation 6.2) may transmit a request message to the other control functions 9. The request message may identify the UE 5 (e.g. via the UE ID data element), properties of the UE (e.g. via the UE Model data element) and/or the type of the application for which the UE is requesting network access (e.g. via the Active UE Application data relevant). In addition, the request message sent in operation 6.2 may include slice information identifying the network slice to which access is being requested. The slice information may be in the form of the Slice ID and/or Slice Type data elements.

Upon receipt of the request message, the other control functions 9 may (in operation 6.3) utilise a policy-based approach to determine whether or not the UE is allowed to access the requested network slice. For instance, the other control functions 9 may determine whether the UE is subscribed to (or otherwise allowed to access) a particular service with which the requested network slice is associated.

In operation 6.4, a request response is passed back from the other control functions 9 to the network control function 8. The response indicates whether or not the UE is allowed to access the requested network slice.

If the response from the other control functions 9 (sent in operation 6.4) indicates that the UE is not allowed access the requested slice, the network control function 8 may send (in operation 6.5) a network slice request response, which indicates that the network slice request has been denied and which also includes the reason for the denial.

If the response from the other control functions 9 (sent in operation 6.4) indicates that the UE is allowed access the requested slice, the network control function 8 (in operation 6.6) constructs a similarity measure for the received network slice selection request. This may be as described with reference to operation S5.3 of FIG. 5.

Subsequently, in operation 6.7, the network control function 8 uses the similarity measure to identify data entries stored in the network slice selection request experience database which correspond with previous requests that are similar to the current network slice selection request received in operation 6.1. This may be as described reference to operation S5.4 of FIG. 5.

In operation 6.8, the network control function 8 determines, based on one more the identified data entries relating to similar previous requests, whether to deny or grant the current network slice selection request. The determination operation 6.8, which may be referred to as an experienced based determination, may be performed as described with reference to operations S5.6 and S5.7 of FIG. 5.

In some examples, operation 6.8 may only be performed if a sufficient number (e.g., a number in excess of the threshold) of similar previous requests can be identified from the network slice selection request experience database. If an insufficient number of similar previous requests are identified, operation 6.9 may be performed. In operation 6.9, an alternative (e.g. rule-based) approach to the determination may be performed.

Subsequent to the determination of either of operations 6.8 and 6.9, the network control function 8 sends a network slice selection request response message (e.g. a mobility management message) to the UE 5. This message indicates whether the network slice selection request has been granted (see operation 6.10) or denied (see operation 6.11).

If the network slice selection request is being granted, as in operation 6.10, the network slice selection request response includes information (e.g. MDDs or NSSAI parameters) identifying the network slice to which access has been granted. This may be the network slice initially requested by the UE 5 or a different network slice selected by the network control function 8.

If the network slice selection request is being denied, as in operation 6.11, the network slice selection request response includes information indicating the reason for the rejection of the request.

Finally, in operation 6.12, the network control function 8 creates/collects experience data relating to the current request. This data may be stored as a data entry in the network slice selection request experience database and may be created/collected as described with reference to operations S3.5 to S3.10 and S3.12 and S3.13 of FIG. 3 and S4.5 to S4.10 and S4.12 and S4.13 of FIG. 4.

As will be appreciated, the operations and processes described above with reference to FIGS. 1 to 6 are examples only. As such, various operations may be performed differently, may be carried out in a different order, and/or may be omitted entirely. For instance, although the above examples generally describe the UE as requesting a specific network slice that is identified in the network slice selection request along with the reason for making the request, this may not be the case. Instead, in some implementations, the UE 5 may not select a specific slice and may instead request access to any appropriate slice. In such examples, the UE 5 may send information indicative of the application and/or details of the service requirements of the application, which may allow the network control function 8 to select an appropriate slice.

Also, FIGS. 3 and 4 depict operations S3.3 and S4.3, in which the network control function 8 determines the network slice to which to grant access, as being separate to the determination as to whether to grant the request. However, in certain examples, these operations may form part of the determination (in operation S3.2 and S4.2) as to whether to grant or deny the network slice selection request. This may be the case, for instance, when the network control function 8 is operable to grant or deny access only to the network slice explicitly requested in the network slice selection request, but is unable to grant access to network slices other than those that have been requested.

FIGS. 7 and 8 are schematic illustrations of example configurations of a UE 5 and a network control function 8 as described with reference to FIGS. 1 to 6.

The UE 5 illustrated in FIG. 7 may be any device capable of at least sending or receiving radio signals to or from the network (e.g., from the network control function 8 via one or more eNB 6) and of performing operations as described above, in particular with reference to FIGS. 1, 2 and 6.

The UE 5 may communicate via an appropriate radio interface arrangement 705 of the UE 5. The interface arrangement 705 may be provided for example by means of a radio part 705-2 (e.g. a transceiver) and an associated antenna arrangement 705-1. The antenna arrangement 705-1 may be arranged internally or externally to the UE 5.

The UE 5 comprises control apparatus 70 which is operable to control the other components of the UE 5 in addition to performing any suitable combinations of the operations described in connection with UE 5 with reference to FIGS. 1, 2 and 6. The control apparatus 70 may comprise processing apparatus 701 and memory 702. Computer-readable code (instructions) 702-2A may be stored on the memory and, when executed by the processing apparatus 701, the computer-readable code 702-2A may cause the control apparatus 70 to perform any of the operations described herein in relation to the UE 5.

Example configurations of the memory 702 and processing apparatus 701 will be discussed in more detail below The UE 5 may be, for example, a device that does not need human interaction, such as an entity that is involved in Machine Type Communications (MTC). Alternatively, the UE 5 may be a device designed for tasks involving human interaction such as making and receiving phone calls between users, and streaming multimedia or providing other digital content to a user. Non-limiting examples include a smart phone, and a laptop computer/notebook computer/tablet computer/e-reader device provided with a wireless interface facility.

Where the UE 5 is a device designed for human interaction, the user may control the operation of the UE 5 by means of a suitable user input interface UII 704 such as key pad, voice commands, touch sensitive screen or pad, combinations thereof or the like. A display 703, a speaker and a microphone may also be provided. Furthermore, the UE 5 may comprise appropriate connectors (either wired or wireless) to other devices and/or for connecting external accessories, for example hands-free equipment, thereto.

As mentioned above, FIG. 8 is a schematic illustration of a network control function 8, which may form part of a radio access network such as that described with reference to FIG. 1 and which may be configured to control access to network services and slices provided by the network. The network control function 8 may be, for instance, a Common Control Network Function (CCNF). The network control function 8 may be in the form of one or more discrete server computers located at one or more physical locations.

The network control function 8 includes control apparatus 80, which may be configured to cause performance of various ones of the operations described above with reference to, in particular, FIGS. 1, 3, 4, 5 and 6.

The network control function 8 includes an input interface 803, via which it can receive data from the UE 5 and/or the other control functions 9. For instance, the network control function 8 may receive network slice selection requests from the UE, for instance via one or more eNBs, at the input interface. Similarly, any messages from the other control functions 9 may also be received at the input interface 803.

The network control function 8 also includes an output interface 809, via which it can send data to the UE is in the network and/or to the other control functions 9. For instance, network slice selection request response messages may be sent to the UEs via the output interface 809.

The control apparatus 80 may comprise processing apparatus 802 and memory 804. Computer-readable code 804-2A may be stored on the memory 804, which when executed by the processing apparatus 802, causes the control apparatus 80 to perform any of the operations assigned to the network control function 8 described above, in particular with reference to FIGS. 1, 3, 4, 5 and 6.

As should of course be appreciated, the apparatuses 5, 8 depicted in each of FIGS. 7 and 8 may comprise further elements which are not directly involved with processes and operations in respect which this application is focussed.

Although not depicted in any of the Figures, the other control functions 9 may have a similar configuration to that depicted in and described with reference to FIG. 8.

Some further details of components and features of the above-described apparatus/entities/apparatuses 5, 8 and alternatives for them will now be described.

The control apparatuses 70, 80 may comprise processing apparatus 701, 802 communicatively coupled with memory 702, 804. The memory 702, 804 has computer readable instructions 702-2A, 804-2A stored thereon, which when executed by the processing apparatus 701, 802 causes the control apparatus 70, 80 to cause performance of various ones of the operations described herein. The control apparatus 70, 80 may in some instance be referred to, in general terms, as "apparatus".

The processing apparatus 701, 802 may be of any suitable composition and may include one or more processors 701A, 802A of any suitable type or suitable combination of types.

For example, the processing apparatus 701, 802 may be a programmable processor that interprets computer program instructions 702-2A, 804-2A and processes data. The processing apparatus 701, 802 may include plural programmable processors. Alternatively, the processing apparatus 701, 802 may be, for example, programmable hardware with embedded firmware. The processing apparatus 701, 802 may alternatively or additionally include one or more Application Specific Integrated Circuits (ASICs). The processing apparatus 701, 802 may be termed processing means or even computing apparatus.

The processing apparatus 701, 802 is coupled to the memory (which may be referred to as one or more storage devices) 702, 804 and is operable to read/write data to/from the memory 702, 804. The memory 702, 804 may comprise a single memory unit or a plurality of memory units, upon which the computer readable instructions (or code) 702-2A, 804-2A is stored. For example, the memory 702, 804 may comprise both volatile memory 702-1 and non-volatile memory 702-2. For example, the computer readable instructions/program code 702-2A, 804-2A may be stored in the non-volatile memory 702-2, 804-2 and may be executed by the processing apparatus 701, 802 using the volatile memory 702-1, 804-1 for temporary storage of data or data and instructions. Examples of volatile memory include RAM, DRAM, and SDRAM etc. Examples of non-volatile memory include ROM, PROM, EEPROM, flash memory, optical storage, magnetic storage, etc. The memories in general may be referred to as non-transitory computer readable memory media.

The term 'memory', in addition to covering memory comprising both non-volatile memory and volatile memory, may also cover one or more volatile memories only, one or more non-volatile memories only, or one or more volatile memories and one or more non-volatile memories.

The computer readable instructions/program code 702-2A, 804-2A may be pre-programmed into the control apparatus 70, 80. Alternatively, the computer readable instructions 702-2A, 804-2A may arrive at the control apparatus 70, 80 via an electromagnetic carrier signal or may be copied from a physical entity 90 such as a computer program product, a memory device or a record medium such as a CD-ROM or DVD an example of which is illustrated in FIG. 9. The computer readable instructions 702-2A, 804-2A may provide the logic and routines that enables the entities devices/apparatuses 5, 8 to perform the functionality described above. The combination of computer-readable instructions stored on memory (of any of the types described above) may be referred to as a computer program product.

In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing apparatus" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. A method comprising:
   determining a response to a network slice selection request from a user equipment based on information included in the network slice selection request that is indicative of a reason for making the network slice selection request,
   also comprising:
   determining a duration of the timer based on a geo-location and or a geo-speed of the user equipment from which the network slice selection request was received;
   creating a data entry corresponding to the received network slice selection request; and
   determining a response to another network slice selection request from a user equipment based at least in part on the created data entry;

wherein, in an event that the network slice selection request to which the data entry relates was granted:
determining whether the network slice selection has been successful; and
including in the data entry an indication as to whether the network slice selection has been successful or unsuccessful, and
wherein determining whether the network slice selection has been successful comprises:
following granting access to the network slice, starting a timer; and
in response to a determination that the timer has expired without a network slice reselection request having been received, determining that that network slice selection has been successful; or
in response to receiving a network slice reselection request prior to expiry of the timer, determining that the network slice selection has been unsuccessful.

2. The method of claim 1, wherein the determined response includes granting access to a network slice to the user equipment or denying the network slice selection request.

3. The method of claim 2, comprising:
providing a network slice selection request response, the network slice selection request response including an indication as to whether the network slice selection request has been granted or denied wherein, when the network slice selection request response includes an indication that the network slice selection request has been denied, the network slice selection request response includes information indicative of a reason for denying the network slice selection request.

4. A method, comprising:
determining a response to a network slice selection request from a user equipment based on information included in the network slice selection request that is indicative of a reason for making the network slice selection request,
also comprising:
determining a duration of the timer based on a geo-location and or a geo-speed of the user equipment from which the network slice selection request was received;
creating a data entry corresponding to the received network slice selection request; and
determining a response to another network slice selection request from a user equipment based at least in part on the created data entry;
wherein, in an event that the network slice selection request to which the data entry relates was granted:
determining whether the network slice selection has been successful; and
including in the data entry an indication as to whether the network slice selection has been successful or unsuccessful, and
in response to receiving the other network slice selection request, determining whether the network slice selection request to the which the created data entry relates is sufficiently similar to the other network slice selection request;
in response to a positive determination, determining the response to the further network slice selection request based at least in part on the created data entry.

5. The method of claim 4, wherein determining the similarity between the further network slice selection request and the network slice selection request to which the created data entry relates is based on one or more of:
information describing the network slices requested in the requests;
information describing the network slices being accessed by the respective user equipment when the requests were sent; and
information describing one or more cells being accessed by the respective user equipment when the requests were sent.

6. The method of claim 4, comprising:
determining the response to the other network slice selection request based at least in part on the indication in the created data entry as to whether the network slice selection to which the data entry relates was successful.

7. The method of claim 6, comprising:
determining the response to the other network slice selection request based at least in part on a determination as to whether a reason for making the further network slice selection request is bounded by the reason for making the network slice selection request to which the created data entry relates.

8. The method of claim 4, further comprising:
in response to receiving the other network slice selection request, identifying plural data entries each relating to a respective previous network slice selection request that is sufficiently similar to the further network slice selection request;
based on the identified data entries, determining one or more success rates based on the indications in the data entries as to whether the network slice selection to which the data entry relates was successful;
comparing the one or more success rates to respective thresholds; and
if the one or more success rates are above the respective thresholds, granting the further network slice selection request by granting access to a network slice to the user equipment that sent the other network slice selection request.

9. The method of claim 8, comprising:
identifying the plural data entries each relating to a respective previous network slice selection request that sufficiently is similar to the other network slice selection request;
determining the one or more success rates based on the identified entries, only if the number of the identified plural data entries exceeds a threshold; and
if the number of the identified plural data entries does not exceed a threshold, determining whether to grant or deny the further network slice selection request without considering the identified data entries.

10. An apparatus comprising:
at least one processor; and
at least one memory including computer program code which, when executed by the at least one processor, causes the apparatus to perform:
determining a response to a network slice selection request from a user equipment based on information included in the network slice selection request that is indicative of a reason for making the network slice selection request;
determining a duration of the timer based on a geo-location and or a geo-speed of the user equipment from which the network slice selection request was received;
creating a data entry corresponding to the received network slice selection request;

determining a response to another network slice selection request from a user equipment based at least in part on the created data entry;

in an event that the network slice selection request to which the data entry relates was granted, the computer program code, with the at least one processor, further causes the apparatus to perform determining whether the network slice selection has been successful; and including in the data entry an indication as to whether the network slice selection has been successful or unsuccessful;

starting a timer following granting access to the network slice; and in response to a determination that the timer has expired without a network slice reselection request having been received, determining that that network slice selection has been successful; or in response to receiving a network slice reselection request prior to expiry of the timer, determining that the network slice selection has been unsuccessful.

11. The apparatus of claim 10, wherein the determined response includes granting access to a network slice to the user equipment or denying the network slice selection request.

12. The apparatus of claim 11, wherein the computer program code, when executed by the at least one processor, causes the apparatus:

to provide a network slice selection request response, the network slice selection request response including an indication as to whether the network slice selection request has been granted or denied wherein, when the network slice selection request response includes an indication that the network slice selection request has been denied, the network slice selection request response includes information indicative of a reason for denying the network slice selection request.

13. An apparatus comprising:

at least one processor; and at least one memory including computer program code which, when executed by the at least one processor, causes the apparatus to perform:

determining a response to a network slice selection request from a user equipment based on information included in the network slice selection request that is indicative of a reason for making the network slice selection request;

determining a duration of the timer based on a geo-location and or a geo-speed of the user equipment from which the network slice selection request was received;

creating a data entry corresponding to the received network slice selection request;

determining a response to another network slice selection request from a user equipment based at least in part on the created data entry;

in an event that the network slice selection request to which the data entry relates was granted, the at least one memory and computer program code, with the at least one processor, further cause the apparatus to perform determining whether the network slice selection has been successful; and including in the data entry an indication as to whether the network slice selection has been successful or unsuccessful;

in response to receiving the other network slice selection request, determining whether the network slice selection request to the which the created data entry relates is sufficiently similar to the other network slice selection request; and in response to a positive determination, determining the response to the further network slice selection request based at least in part on the created data entry.

14. The apparatus of claim 13, wherein the computer program code, when executed by the at least one processor, further causes the apparatus to determine the similarity between the further network slice selection request and the network slice selection request to which the created data entry relates is based on one or more of:

information describing the network slices requested in the requests;

information describing the network slices being accessed by the respective user equipment when the requests were sent; and information describing one or more cells being accessed by the respective user equipment when the requests were sent.

15. The apparatus of claim 13, wherein the computer program code, when executed by the at least one processor, further causes the apparatus:

to determine the response to the other network slice selection request based at least in part on the indication in the created data entry as to whether the network slice selection to which the data entry relates was successful.

16. The apparatus of claim 13, wherein the computer program code, when executed by the at least one processor, further causes the apparatus:

in response to receiving the other network slice selection request, to identify plural data entries each relating to a respective previous network slice selection request that is sufficiently similar to the further network slice selection request;

based on the identified data entries, to determine one or more success rates based on the indications in the data entries as to whether the network slice selection to which the data entry relates was successful;

to compare the one or more success rates to respective thresholds; and if the one or more success rates are above the respective thresholds, to grant the further network slice selection request by granting access to a network slice to the user equipment that sent the other network slice selection request.

17. The apparatus of claim 15, wherein the computer program code, when executed by the at least one processor, further causes the apparatus:

to determine the response to the other network slice selection request based at least in part on a determination as to whether a reason for making the further network slice selection request is bounded by the reason for making the network slice selection request to which the created data entry relates.

* * * * *